(12) United States Patent
Liu

(10) Patent No.: US 10,508,651 B2
(45) Date of Patent: Dec. 17, 2019

(54) AUTOMATIC INFLATION DEVICE

(71) Applicant: Guangdong Travelmall Health Technology Co., Ltd., Dongguan (CN)

(72) Inventor: Zhiming Liu, Dongguan (CN)

(73) Assignee: Guangdong Travelmall Health Technology Co., Ltd., Dongguan (CN)

( * ) Notice: Subject to any disclaimer, the term of this patent is extended or adjusted under 35 U.S.C. 154(b) by 362 days.

(21) Appl. No.: 15/462,233

(22) Filed: Mar. 17, 2017

(65) Prior Publication Data

US 2017/0191483 A1 Jul. 6, 2017

(30) Foreign Application Priority Data

Jan. 4, 2017 (CN) .......................... 2017 1 0004310

(51) Int. Cl.
| | | |
|---|---|---|
| *F04D 29/54* | (2006.01) | |
| *F04D 17/16* | (2006.01) | |
| *F04D 25/06* | (2006.01) | |
| *F04D 29/28* | (2006.01) | |
| *F04D 29/46* | (2006.01) | |
| *F16K 5/04* | (2006.01) | |
| *F16K 15/14* | (2006.01) | |

(52) U.S. Cl.
CPC ......... *F04D 17/16* (2013.01); *F04D 25/0673* (2013.01); *F04D 29/28* (2013.01); *F04D 29/464* (2013.01); *F16K 5/0414* (2013.01); *F16K 15/147* (2013.01)

(58) Field of Classification Search
CPC ........ A47C 27/082; F04D 25/08; F04B 35/04
USPC ..... 415/206, 208.1, 220; 417/237, 297, 304, 417/315, 423.14
See application file for complete search history.

(56) References Cited

U.S. PATENT DOCUMENTS

| | | | | | |
|---|---|---|---|---|---|
| 6,155,781 | A | * | 12/2000 | Tsai ...................... | F04D 25/084 415/182.1 |
| 8,024,870 | B1 | * | 9/2011 | Ballentine ................. | A45F 3/20 34/104 |
| 2006/0073045 | A1 | * | 4/2006 | Tsai ........................ | F04D 27/00 417/423.14 |
| 2010/0247356 | A1 | * | 9/2010 | Tsai ..................... | A47C 27/082 417/423.14 |
| 2013/0052050 | A1 | * | 2/2013 | Tsai ...................... | F04D 25/084 417/360 |

* cited by examiner

*Primary Examiner* — Long T Tran
*Assistant Examiner* — James J Kim
(74) *Attorney, Agent, or Firm* — Shimokaji IP

(57) ABSTRACT

An automatic inflation device includes a valve body, a miniature motor and a centrifugal impeller. The valve body is provided with an air inlet and an inflation inlet, a check valve that is unidirectionally opened outwards the valve body is provided at the inflation inlet, a wind chamber and a wind guide path connected with the wind chamber are configured in the valve body, the miniature motor and the centrifugal impeller are installed in the wind chamber, the centrifugal impeller is actuated by the miniature motor, the wind chamber is communicated with the inflation inlet via the wind guide path, and the air inlet is communicated with a wind inlet of the wind chamber. The structure of the device is compact and reduced, which is applicable to directly install into inflation products. The device can inflate automatically and efficiently, and the structure is simplified and easy to actualize.

9 Claims, 14 Drawing Sheets

AUTOMATIC INFLATION DEVICE

RELATED APPLICATIONS

This application claims the benefit of priority to Chinese Invention Application No. 201710004310.4, filed Jan. 4, 2017, which is hereby incorporated by reference in its entirety.

FIELD OF THE INVENTION

The invention relates to an automatic inflation device, and more particularly to an automatic inflation device that has simple structure and compact size.

BACKGROUND OF THE INVENTION

Inflation products such as inflation toys, swing rings, inflation pillows or inflation mattresses will be deflated when not in use, so as to reduce the size to store and carry conveniently. While in use, the products needs to be inflate. The original inflating way is to directly blow air to the product by using the mouth; apparently, such a way is inefficient and unhealthful.

Some new type inflation products are provided with an inflation device for manual operation. Such an inflation device includes an air valve and an airbag, the interior of the produce is communicated with the outside via the air valve. The product will be inflated by repeatedly pressing the airbag, which does not need mouth to blow air. However, the inflation efficiency is still to be improved.

An efficient inflation way is to use an inflation tool such as an inflator or an air inflation pump to save time and effort, but such a tool is complicated and heavy, which is inconvenient to carry or can not be directly mounted to the products, thus the applicability is weak.

Therefore, there is a need for providing an automatic inflation device that has simple structure and compact size, to overcome the above-mentioned drawbacks.

SUMMARY OF THE INVENTION

One objective of the present invention is to provide an automatic inflation device that has simple structure and compact size.

To achieve the above-mentioned objective, the present invention provides an automatic inflation device comprising a valve body, a miniature motor and a centrifugal impeller. The valve body is provided with an air inlet and an inflation inlet, a check valve that is unidirectionally opened outwards the valve body is provided at the inflation inlet, a wind chamber and a wind guide path connected with the wind chamber are configured in the valve body, the miniature motor and the centrifugal impeller are installed in the wind chamber, the centrifugal impeller is actuated by the miniature motor, the wind chamber is communicated with the inflation inlet via the wind guide path, and the air inlet is communicated with a wind inlet of the wind chamber.

In comparison with the prior art, because the miniature motor and the centrifugal impeller are mounted in the wind chamber of the inner valve body, and the inner valve body is contained in the outer valve body, thus the structure of the automatic inflation device is compact and reduced, which is applicable to directly install into inflation products. When the centrifugal impeller is actuated by the miniature motor to pump the air to the wind chamber, and then the air is guided to the inflation inlet along the wind guide path, impacts on the check valve and finally enters to the product to accomplish the inflation. During the inflation, as the check valve could not be opened towards the inside of the valve body, thus the rotation of the centrifugal impeller may not be impacted by the increased pressure inside the product, instead, the centrifugal impeller can maintain a constant power, rather than needs an increased power varied with an increased pressure in the product. The automatic inflation device can inflate automatically and efficiently, and the structure is simplified and easy to actualize.

Preferably, the wind guide path has a first end that is connected with the wind chamber and a second end that is communicated with the inflation inlet, and the wind guide path is tapered from the first end to the second end. This structure is beneficial to gather air flow and increase the air speed so as to improve the inflation efficiency.

Preferably, two connection portions are respectively configured at two sides of the inflation inlet to connect with two sidewalls of the wind guide path. Based on this connection, air flow coming from the wind chamber can be exactly guided to the inflation inlet, rather than leaked from the sides of the wind guide path.

Preferably, the wind chamber has a circular portion, and a sidewall of the wind guide path is extended along a tangent line of the wind chamber. Based on such a configuration, air flow guided by the wind guide path has higher speed.

Preferably, the wind chamber and the wind guide path are movable in the valve body to make the wind guide path and the inflation inlet be staggered. When the wind guide path and the inflation inlet are staggered, air flow generated by the centrifugal impeller may not inflate the product, but can achieve other functions.

Preferably, a wind channel is configured in the valve body and located outside the wind chamber to follow the wind chamber to move, the wind channel is separated from the wind guide path when the wind guide path is aligned with the inflation inlet, and the wind channel is communicated with the wind guide path via an interior space of the valve body when the wind guide path and the inflation inlet is staggered. When the wind guide path and the inflation inlet are aligned, the air flow generated by the centrifugal impeller will goes into the inflation inlet to inflate, when they are staggered, the air flow from the centrifugal impeller will goes into the wind channel via the wind guide path.

Preferably the valve body comprises an outer valve body and an inner valve body that is rotatablely received in the outer valve body, the air inlet and the inflation inlet are configured on the outer valve body the wind chamber, the wind guide path and the wind channel are configured in the inner valve body, and the inner valve body is rotational relative to the outer valve body to make the wind guide path and the inflation inlet be aligned or staggered. Directions of the air flow can be easily switched by rotating the inner valve body.

Preferably, the inner valve body comprises a lower valve body and an upper valve body that is mounted on the lower valve body, the wind chamber, the wind guide path and the wind channel are configured in the lower valve body, the wind inlet is configured at a top of the lower valve body, and an upper end of the wind channel is open; the upper valve body comprises a flange portion extended downwards the lower valve body, by which an interior space of the upper valve body is divided into a center space and a peripheral space, the air inlet is configured at a top of the upper valve body and communicated with the wind inlet via the interior space, and the upper valve body is further provided with an air outlet that is communicated with the wind channel via the peripheral space.

Preferably, two positioning grooves are separately formed on an outer surface of the inner valve body, a spring leaf is mounted in the outer valve body, the wind guide path is aligned with the inflation inlet when the spring leaf is inserted into one of the positioning groove, and the wind guide path and the spring leaf is triggered and separated when the spring leaf is inserted into another positioning groove. By means of engagement between the spring leaf and the two positioning grooves, two using statuses can be exactly located by rotating the inner valve body.

Preferably two limiting parts are separately formed on an inner wall of the outer valve body and extended inwards, a limiting rib is formed on an outer surface of the inner valve body and extended outwards, and the limiting rib is movable between the two limiting parts while the inner valve body is rotated.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1:
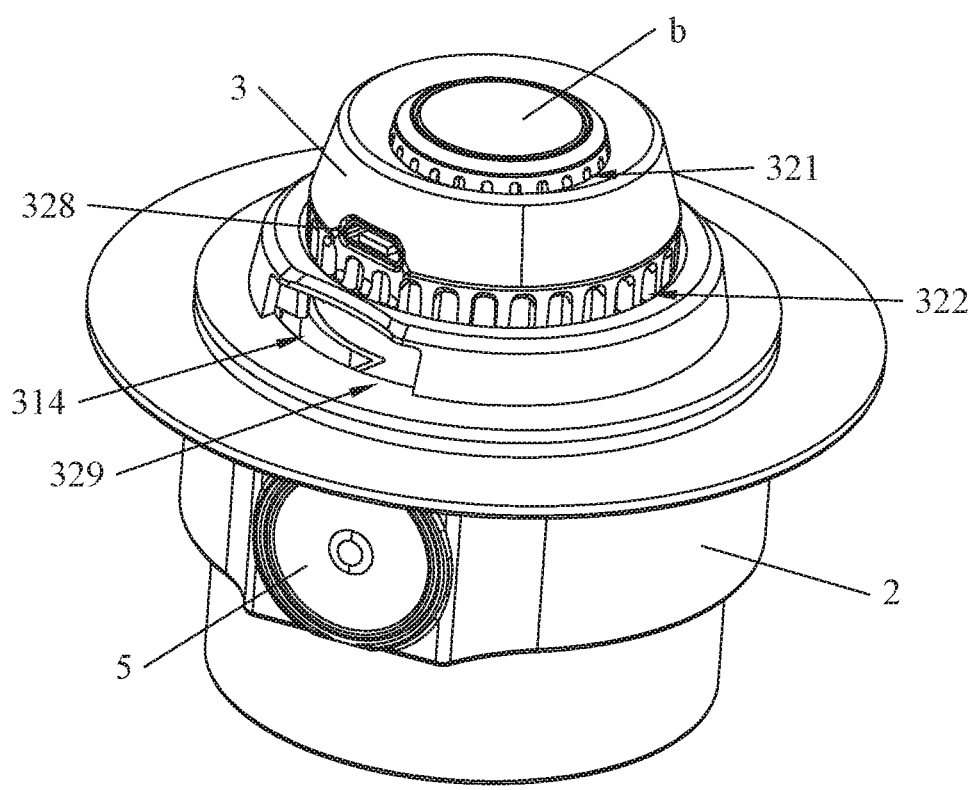
FIG. 1 is a perspective view of an automatic inflation device according to the present invention.
Figure 2:
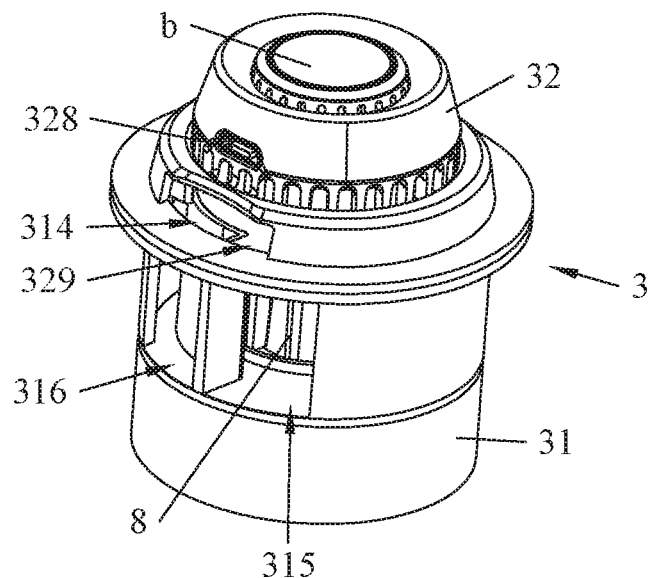
FIG. 2 is an exploded view of the automatic inflation device with the outer valve body and the inner valve body separated.
Figure 2:
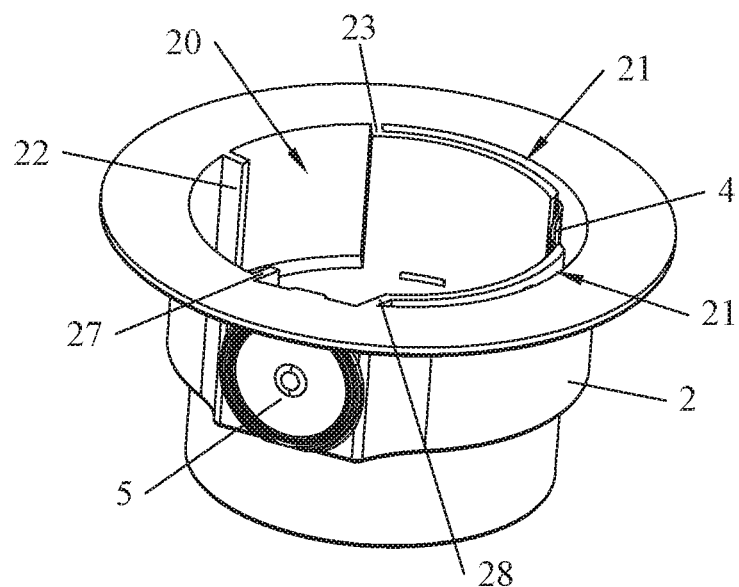

Referring to FIGS. 1 and 2, the present invention provides an automatic inflation device 1, which can be mounted on inflation products such as inflation pillows, inflation toys, and inflation mattress to inflate efficiently. The automatic inflation device 1 has a valve body which includes an outer valve body 2 and an inner valve body 3 received in the outer valve body. Specific structures of the outer valve body 2 and the inner valve body 3 will be explained firstly, and their connection relationship and operation of the automatic inflation device 1 will be explained subsequently.

Figure 3:
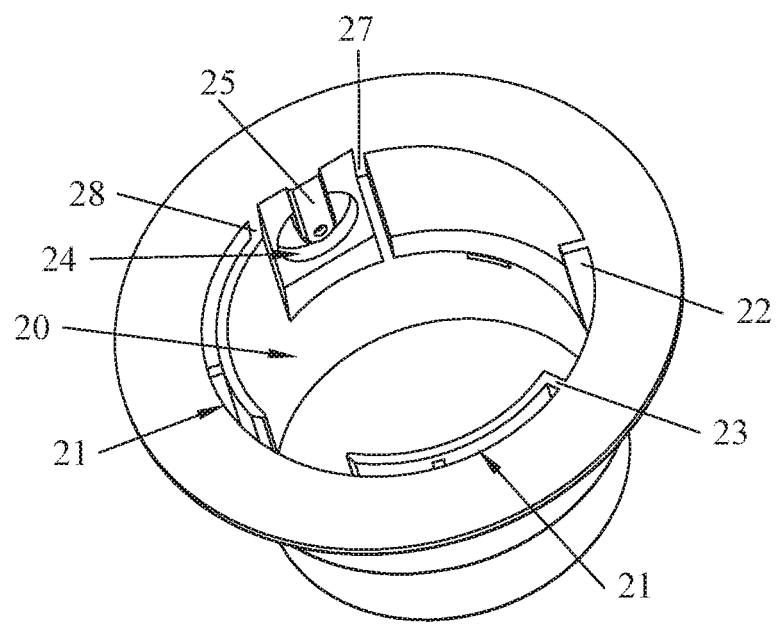
FIG. 3 is a structure view of the outer valve body.
Figure 4:
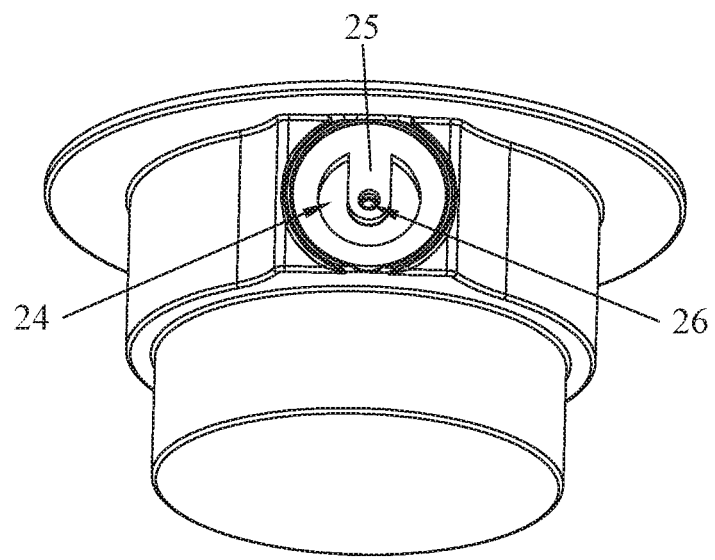
FIG. 4 is a structure view of the outer valve body seen from anther angle.

Combining with FIGS. 3 and 4, the outer valve body 2 is in a hollow structure, a receiving cavity 20 is formed in the interior to receive the inner valve body 3, two retaining recesses 21 are separately formed on the inner wall of the outer valve body 2, each of which includes an open top and a closed bottom. Furthermore, a first limiting part 22 is extended from the inner wall of the outer valve body 2, and the retaining recess 21 adjacent to the first limiting part 22 has an end wall which is severed as a second limiting part 23, specifically, the first limiting part 22 and the second limiting part 23 are separated each other. An inflation inlet 24 is configured on the side wall of the outer valve body 2, when the automatic inflation device 1 is installed in an inflation product, this inflation inlet 24 will be located in the product. A suspension arm 25 is extended into the inflation inlet 24, and a locating hole 26 is provided at one end of the suspension arm 25. A first connection portion 27 is extended from the inner wall of the inner valve body 3, and the retaining recess 21 has another end wall which is severed as a second connection portion 28, both of the first and the second connection portions 27, 28 are respectively located at two sides of the inflation inlet 24.

Figure 5:
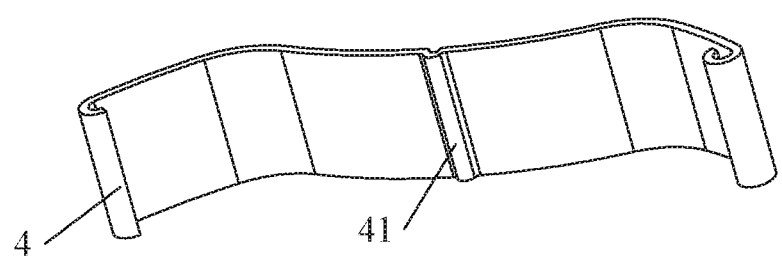
FIG. 5 is a structure view of the spring leaf of the outer valve body.
Figure 6:
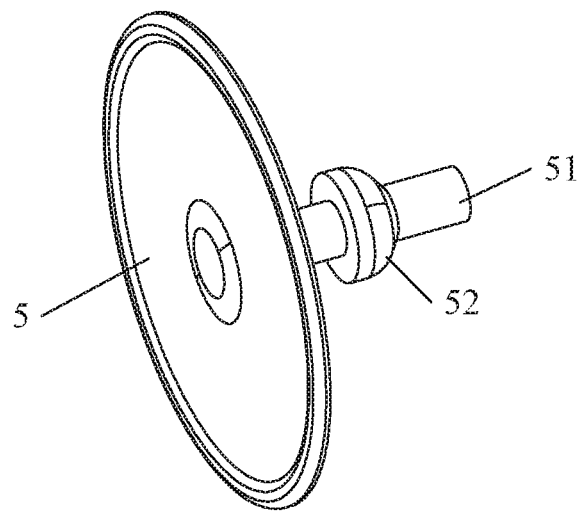
FIG. 6 is a structure view of the check valve of the outer valve body.
Figure 7:
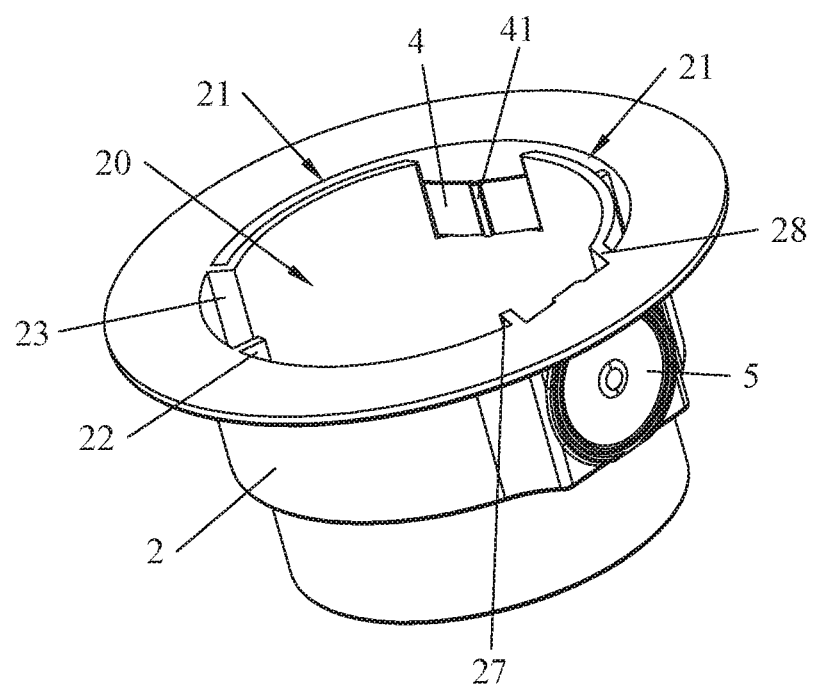
FIG. 7 is a structure view showing the spring leaf and the check valve are mounted on the outer valve body.

Referring to FIGS. 5 and 7, the automatic inflation device 1 further includes a spring leaf 4 and a check valve. Specifically, the spring leaf 4 is shaped as a leaf, which has a ridge 41 protruded from the middle of the spring leaf 4. Specifically, two ends of the spring leaf 4 is inserted into the two retaining recesses 21 from top to bottom, causing the ridge 41 is exposed between the two retaining recesses 21 and faces to the interior of the outer valve body 2. The spring leaf 4 will be deformed when suffering a pressure. The check valve is a resilient leaf 5 that is sized to correspond with the inflation inlet 24. A fixing pin 51 is formed on the resilient leaf 5, and a ridge portion 52 is radially expanded from the fixing pin 51. When the fixing pin 51 is inserted into the locating hole 26 of the suspension arm 25, until the ridge portion 52 runs through the suspension arm 25, the resilient leaf 5 will be fixed to the outer valve body 2 and covered and sealed the inflation inlet 24, under this case, the resilient leaf 5 is deformable only outwards the outer valve body 2.

Figure 8:
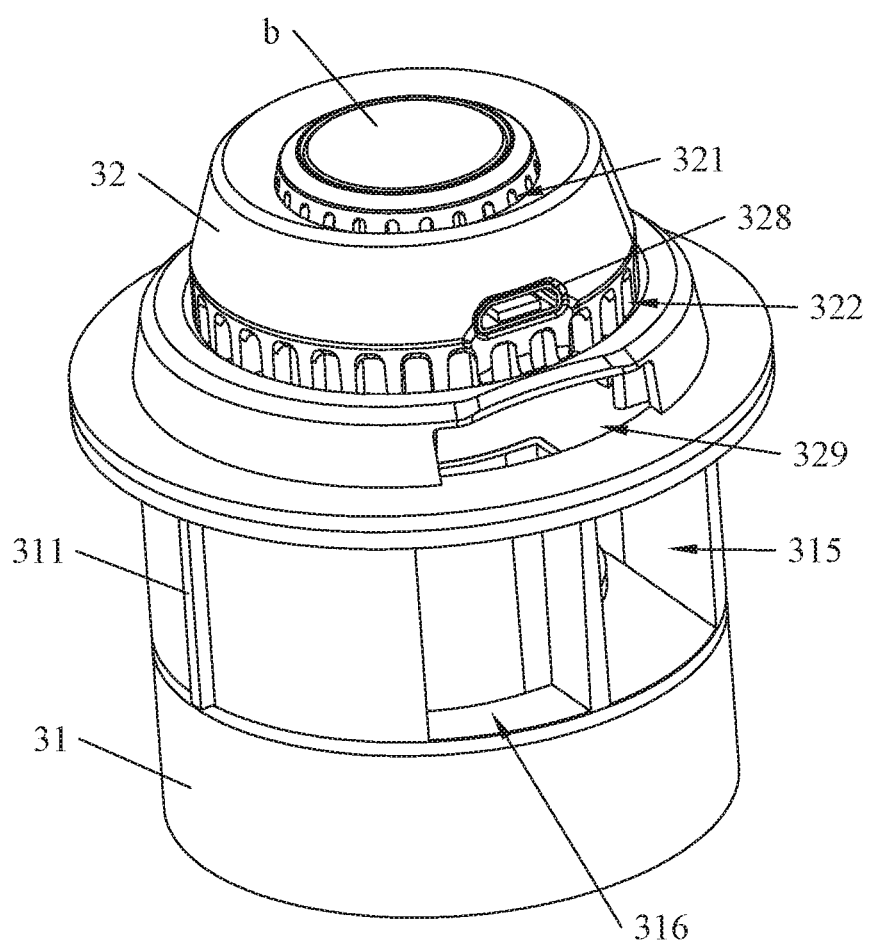
FIG. 8 is a structure view of the inner valve body.
Figure 9:
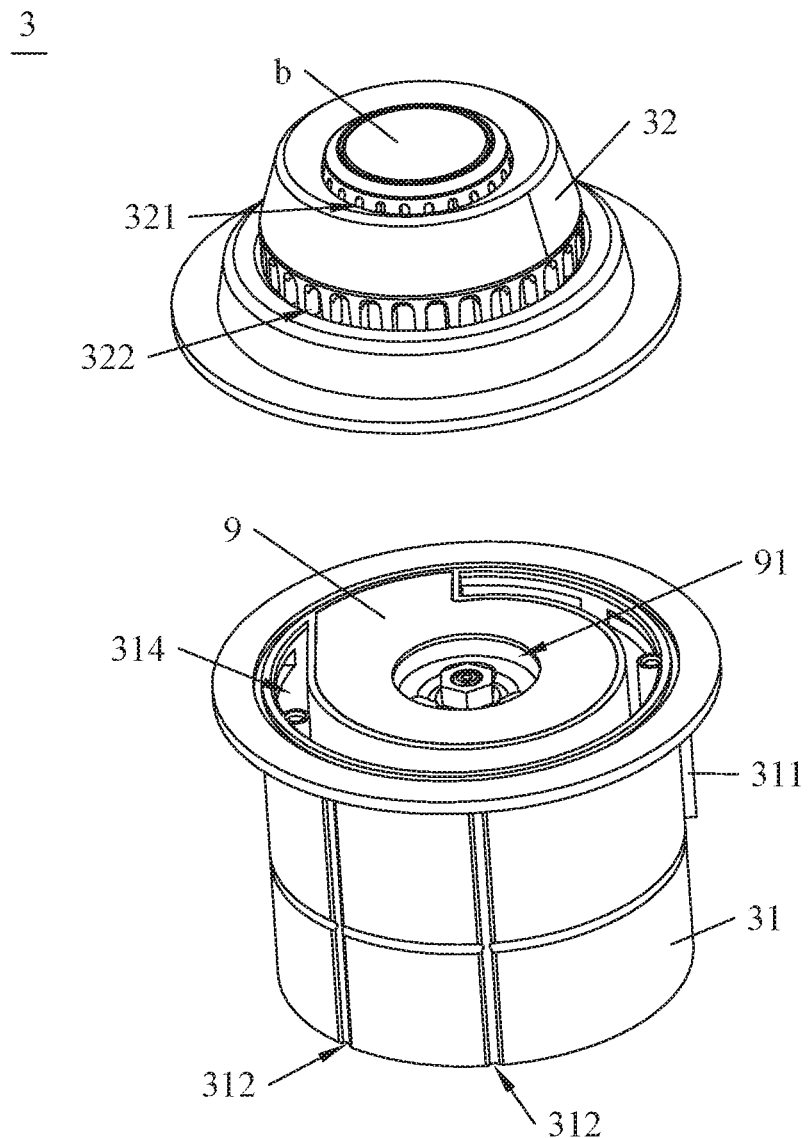
FIG. 9 is an exploded view of the inner valve body with the upper valve body and the lower valve body separated.

As shown in FIGS. 8 and 9, the inner valve body 3 includes a lower valve body 31 and an upper valve body 32 mounted on the lower valve body 31. As illustrated, the lower valve body 31 is shaped and sized accordingly the receiving cavity 20 of the outer valve body 2, so that the lower valve body 31 nicely matches with the outer valve body 2 when the inner valve body 3 inserts into the outer valve body 2. Further, the inner valve body 3 can be rotated around a vertical axis in the outer valve body 2. A limiting rib 311 is protruded from the outer surface of the lower valve body 31, and two positioning grooves 312 are separately formed on the outer surface of the lower valve body 31, therein, the sizes of the positioning grooves 312 are corresponding with that of the ridge 41 of the spring leaf in FIG. 5, so that the ridge 41 can be embedded in the positioning groove 312.

Figure 10:
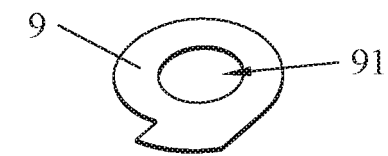
FIG. 10 is a schematic view showing the lower valve and the components therein.
Figure 10:
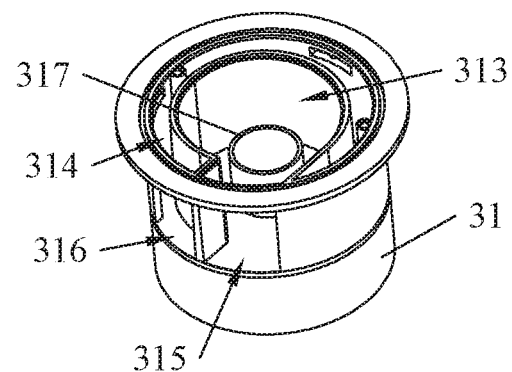
Figure 10:
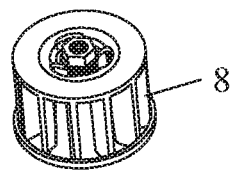
Figure 10:
Figure 10:
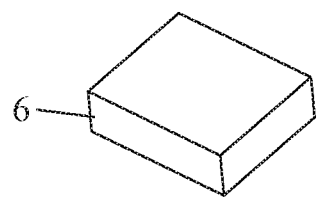
Figure 10:
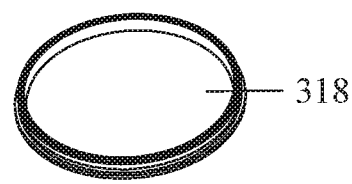

By combination of FIG. 10, the lower valve 31 includes a wind chamber 313, a wind guide path 315 and a wind channel 314 around the wind chamber 313. In detail, the wind chamber 313 and the wind guide path 315 are approximately shaped as a small letter of "b", the wind guide path 315 extends on and runs through the side wall of the lower valve body 31, and the wind chamber 313 is separated from the wind channel 314 in the radial direction. The wind channel 314 has an entry 316 that is formed on the side wall of the lower valve body 31 and adjacent to the wind guide path 315. Preferably, the wind chamber 313 has a circular portion, and the wind guide path 315 has one side wall that is extended along a tangent line of the circular portion and another side wall whose extension line approximately extends to the center of the circular portion, in such a configuration, airflow coming from the wind chamber may have a higher speed.

Furthermore, in this embodiment, the wind guide path 315 is tapered from inside to outside, that is, the diameter of the wind guide path 315 is gradually reduced from one end connected with the wind chamber 313 to the other end communicated with the inflation inlet 24. As a result, such a configuration of the wind guide path 315 is beneficial to gather airflow and improve the air speed. Of course, the wind guide path 315 in other embodiments can have a uniform structure that has the same diameters at the ends.

In addition, the wind chamber 313 has a ring of fixing rib 317 that is formed in the middle. A battery container is formed at the bottom of the lower valve body 31, which is enclosed by a cover 318.

Figure 13:
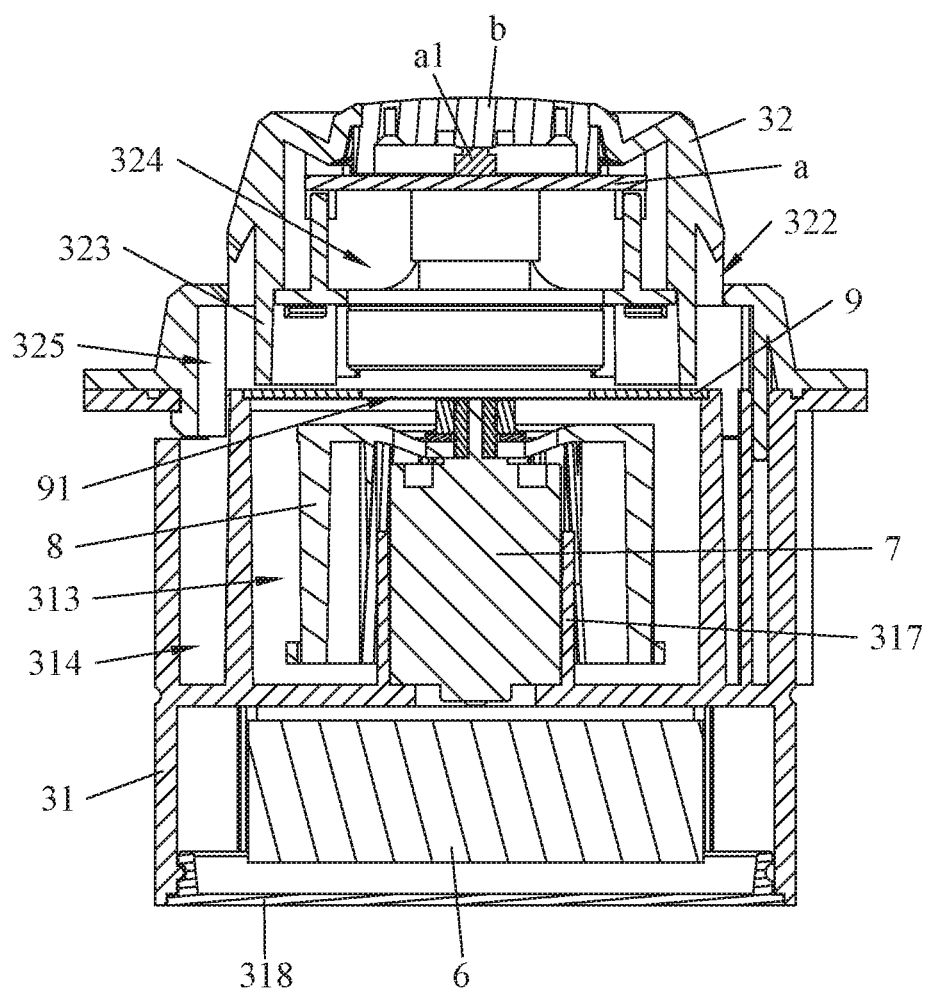
FIG. 13 is a sectional view of the inner valve body.

Combining with FIG. 10 and FIG. 13, the automatic inflation device 1 further includes a battery 6, a miniature motor 7, a centrifugal impeller 8 and a cover plate 9. The battery 6 is mounted in the battery container on the bottom of the lower valve body 31, the miniature motor 7 is mounted to the fixing rib 317 and fixed to the lower valve boy 31, and the centrifugal impeller 8 is formed around the fixing rib 317 and fixed to an output axis of the miniature motor 7. In such a way, the miniature motor 7 is supplied power by the battery 6 and then actuates the centrifugal impeller 8 to rotate. Specifically the cover plate 9 is shaped according to the integrated shape of the wind chamber 313 and the wind guide path 315, and the cover plate 9 is covered on the wind chamber 313 and the wind guide path 315 and fixed to the lower valve body 31. A through hole 91 on the cover plate 9 is served as the wind inlet of the wind chamber 313. The upper end of the wind channel 314 is open.

Figure 11:
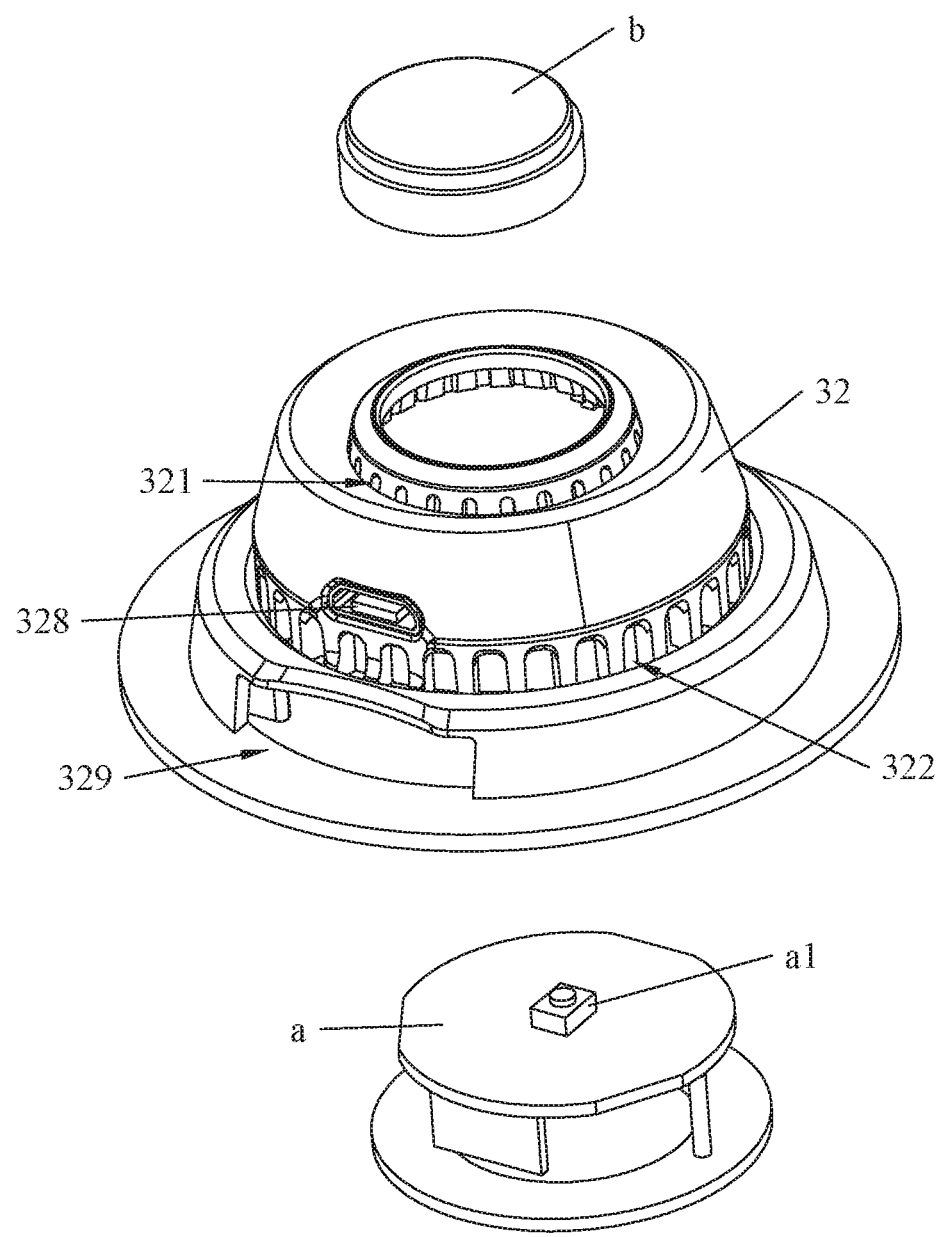
FIG. 11 is a schematic view showing the upper valve body, the keys and the circuit board.
Figure 12:
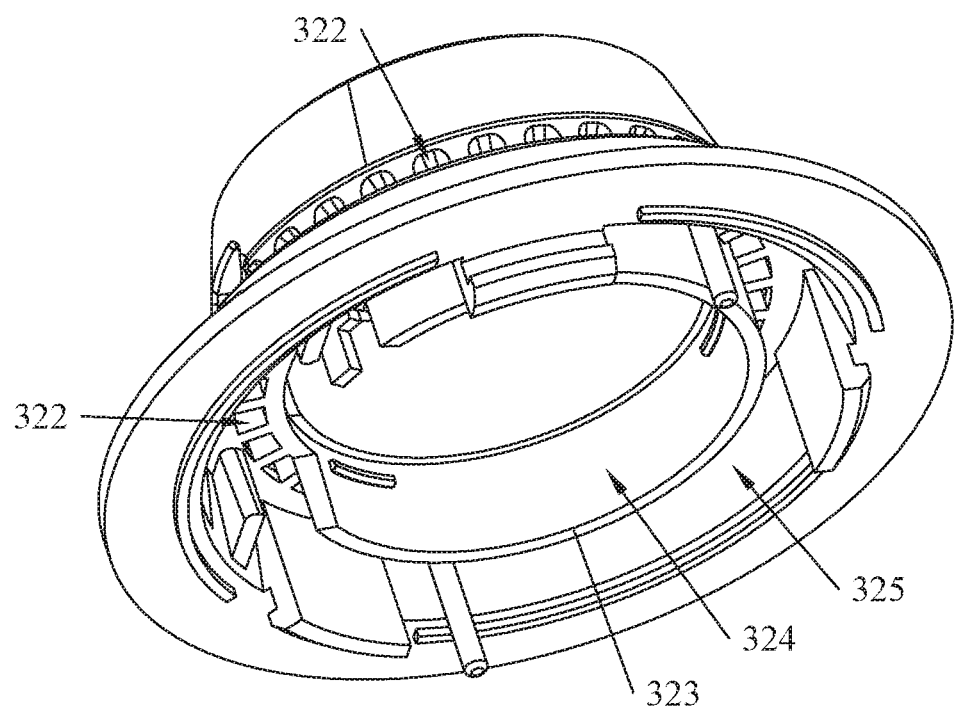
FIG. 12 is a perspective view of the upper valve body.

As shown in FIGS. 11 and 12, multiple air inlets 321 and multiple air outlets 322 are formed through the side wall of the upper valve body 32, which are respectively arranged along the periphery of the upper valve body 32. Specifically, the air inlets 321 are located above the air outlets 322, The upper valve body 32 includes a flange portion 323 that is extended downwards, by means of which the interior space of the upper valve body 32 is divided into an center space 324 and a peripheral space 325. A circuit board 2a is installed in the upper valve body 32, and a first key 1a is formed on the circuit board 2a; a second key 1b is configured at the top of the upper valve body 32 and located in the center of the ring of the air inlets 321, specifically, the second key 1b is connected with the first key 1a, and the first key 1a will be triggered once the second key 1b is pressed.

Combining FIGS. 8 to 13, the upper valve body 32 is assembled to the lower valve body 31 by means of snap fit, after the assembly; the air inlets 321 are communicated with the wind chamber 313 via the center space 324 and the wind inlet 91, and the wind channel 314 is communicated with the air outlets 322 via the peripheral space 325. The circuit board 2a is electrically connected to the battery 6 and the miniature motor 7, in such a way, the battery 6 supplies power for the circuit board 2a, and the circuit board 2a controls the miniature motor 7 to start or stop and control the speed. For example, the control ways can take motions on the second key 1b including one-press motion, twice-press motion, three-press motion or touch-hold press motion. Furthermore, a charging interface 328 is formed on the upper valve body 32 and electrically connected to the circuit board 2a, via which the battery 6 can be charged by a charger or a data wire.

Figure 14:
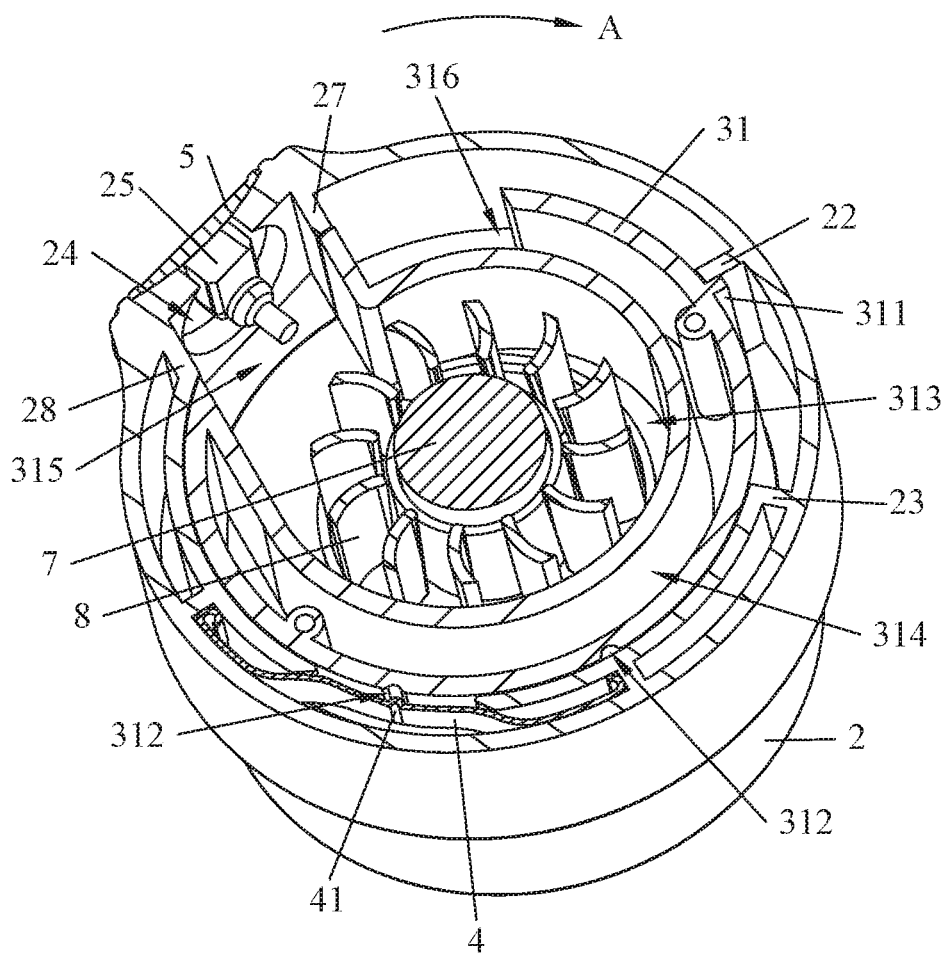
FIG. 14 is a perspective sectional view of the valve body when the wind guide path is aligned with the inflation inlet.

Referring to FIG. 14, after the inner valve body 3 is installed to the outer valve body 2, the limiting rib 311 on the outer surface of the lower valve body 31 is located between the limiting parts 22 and 23, by means of the engagement therebetween, the rotating range and the rotating direction of the inner valve body 3 in the outer valve body 2 are restricted. When the ridge 41 of the spring leaf 4 is engaged with the positioning groove 312, the wind guide path 315 is aligned with the inflation inlet 24, and the two side walls of the wind guide path 315 are connected to the connection portion 27 and the connection portion 28 respectively, thus air flow generated in the wind chamber 313 will be guided to the inflation inlet 24 by the wind guide path 315, rather than leaked from the side walls of the wind guide path 315, moreover the wind guide path 315 will lie separated from the entry 316 of the wind channel 314.

Under this status, the miniature motor 7 is started up to rotate the centrifugal impeller 8, causing the air is pumped through the air inlets 321, the center space 324 and the wind inlet 91 and then goes into the wind chamber 313. Due to the centrifugal impeller 8, the air in the wind chamber 313 will be accelerated, then gathered in the guide wind slot 315 and finally discharged to the inflation inlet 24. When the air flow reaches to a certain degree, the resilient leaf 5 is deformed to open the inflation inlet 24, as a result, the air flow enters inside the product to accomplish the inflation. When the miniature motor 7 is stopped, since the resilient leaf 5 could not deform towards the inside of the product, thus air in the product will not be leaked out. In other embodiments, the check valve can have other structures, such as a spring included.

Figure 15:
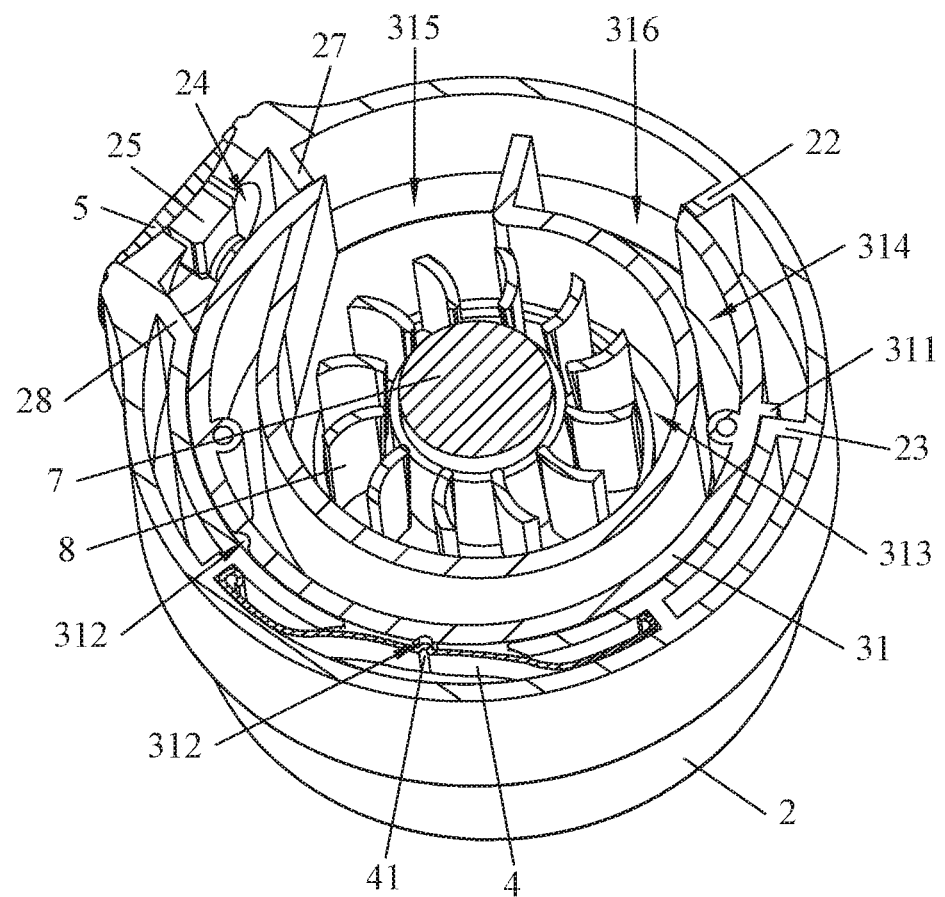
FIG. 15 is a perspective sectional view of the valve body when the wind guide path and the inflation inlet are staggered.

If the inner valve body 3 is rotated along the direction A shown in FIG. 14 to another position as illustrated in FIG. 15, the ridge 41 of the spring leaf 4 is inserted into another positioning groove 312, in this situation, the wind guide path 315 and the inflation inlet 24 are staggered and separated each other, and the entry 316 of the wind channel 314 is communicated with the wind guide path 315 via the space between the limiting part 22 and the connection portion 27. Air flow from the wind guide path 315 goes through the entry 316 and the wind channel 314, then goes into the peripheral space 325 and finally discharges from the air outlets 322. The inflation device 1 will not inflate the product under this status.

Figure 16:
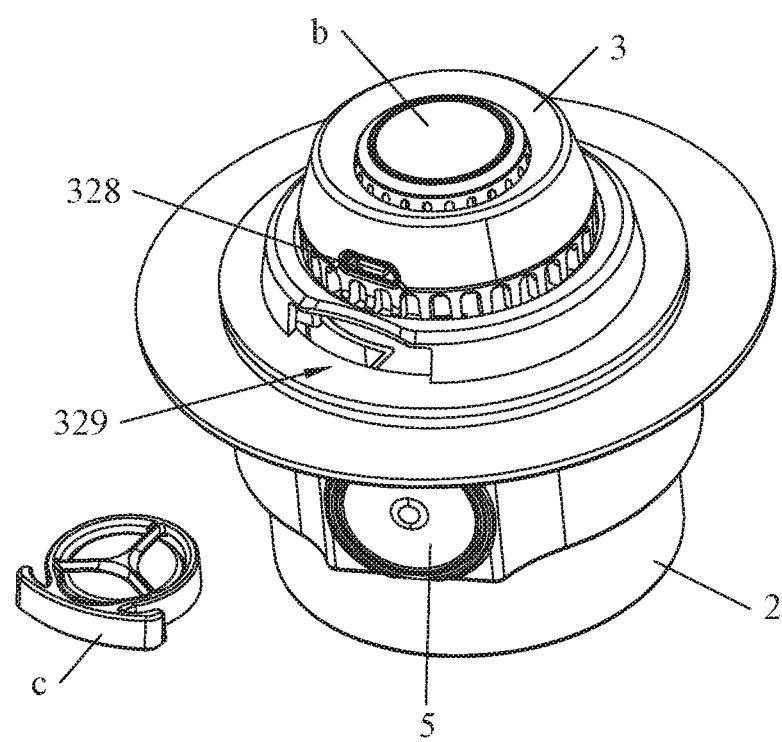
FIG. 16 is a schematic view showing the automatic inflation device before a tablet container is inserted.

By combination with FIG. 16, a notch 329 is formed on the upper valve body 32 and communicated with the peripheral space 325, and a tablet container 3c is inserted into the notch 329 and supported on the cover plate 9. Preferably, some volatile tablets are stored in the tablet container 3c, a smell of the table will be diffused from the air outlets 322 when the air flow is blown upwards in the wind channel 314. The tablet can refresh air, make people be refreshing or soothing accordingly to different chemical compositions of different tablets. By this token, by rotating the inner valve body 3 relatively to the outer valve body 2, people could choose inflation function or exhaust function.

In comparison with the prior art, because the miniature motor 7 and the centrifugal impeller 8 are mounted in the wind chamber 313 of the inner valve body 3, and the inner valve body 3 is contained in the outer valve body 2, thus the structure of the automatic inflation device 1 is compact and reduced, which is applicable to directly install into inflation products. When the centrifugal impeller 8 is actuated by the miniature motor 7 to pump the air to the wind chamber 313, and then the air is guided to the inflation inlet 24 along the wind guide path 315, impacts on the check valve and finally enters to the product to accomplish the inflation. During the inflation, as the check valve could not be opened towards the inside of the valve body, thus the rotation of the centrifugal impeller 8 may not be impacted by the increased pressure inside the product, instead, the centrifugal impeller 8 can maintain a constant power, rather than needs an increased power varied with an increased pressure in the product. The automatic inflation device 1 can inflate automatically and efficiently, and the structure is simplified and easy to actualize.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. An automatic inflation device, comprising a valve body, a miniature motor and a centrifugal impeller, wherein the valve body is provided with an air inlet and an inflation inlet, a check valve that is unidirectionally opened outwards the valve body is provided at the inflation inlet, a wind chamber and a wind guide path connected with the wind chamber are configured in the valve body, the miniature motor and the centrifugal impeller are installed in the wind chamber, the centrifugal impeller is actuated by the miniature motor, the wind chamber is communicated with the inflation inlet via the wind guide path, and the air inlet is communicated with a wind inlet of the wind chamber, a wind channel is configured in the valve body and located outside the wind chamber to follow the wind chamber to move, the valve body comprises an outer valve body and an inner valve body that is rotatably received in the outer valve body, the air inlet and the inflation inlet are configured on the outer valve body, the wind chamber, the wind guide path and the wind channel are configured in the inner valve body, and the inner valve body is rotational relative to the outer valve body to make the wind guide path and the inflation inlet be aligned or staggered.

2. The automatic inflation device according to claim 1, wherein the wind guide path has a first end that is connected with the wind chamber and a second end that is communicated with the inflation inlet, and the wind guide path is tapered from the first end to the second end.

3. The automatic inflation device according to claim 1, wherein two connection portions are respectively configured at two sides of the inflation inlet to connect with two sidewalls of the wind guide path.

4. The automatic inflation device according to claim 1, wherein the wind chamber has a circular portion, and a sidewall of the wind guide path is extended along a tangent line of the wind chamber.

5. The automatic inflation device according to claim 1, wherein the wind chamber and the wind guide path are movable in the valve body to make the wind guide path and the inflation inlet be staggered.

6. The automatic inflation device according to claim 5, wherein the wind channel is separated from the wind guide path when the wind guide path is aligned with the inflation inlet, and the wind channel is communicated with the wind guide path via an interior space of the valve body when the wind guide path and the inflation inlet is staggered.

7. The automatic inflation device according to claim 6, wherein the inner valve body comprises a lower valve body and an upper valve body that is mounted on the lower valve body, the wind chamber, the wind guide path and the wind channel are configured in the lower valve body, the wind inlet is configured at a top of the lower valve body, and an upper end of the wind channel is open;

the upper valve body comprises a flange portion extended downwards the lower valve body, by which an interior space of the upper valve body is divided into a center space and a peripheral space, the air inlet is configured at a top of the upper valve body and communicated with the wind inlet via the interior space, and the upper valve body is further provided with an air outlet that is communicated with the wind channel via the peripheral space.

8. The automatic inflation device according to claim 6, wherein two positioning grooves are separately formed on an outer surface of the inner valve body, a spring leaf is mounted in the outer valve body, the wind guide path is aligned with the inflation inlet when the spring leaf is inserted into one of the positioning groove, and the wind guide path and the spring leaf is triggered and separated when the spring leaf is inserted into another positioning groove.

9. The automatic inflation device according to claim 6, wherein two limiting parts are separately formed on an inner wall of the outer valve body and extended inwards, a limiting rib is formed on an outer surface of the inner valve body and extended outwards, and the limiting rib is movable between the two limiting parts while the inner valve body is rotated.

* * * * *